United States Patent [19]

Loikitz

[11] 4,417,430

[45] Nov. 29, 1983

[54] DIRECT DRIVE POSITIVE LOCKING PANEL FASTENER

[75] Inventor: Frank F. Loikitz, Middletown, N.J.

[73] Assignee: Standard Keil Hardware Manufacturing Co., Allenwood, N.J.

[21] Appl. No.: 243,327

[22] Filed: Mar. 13, 1981

[51] Int. Cl.³ .................................................. F16B 2/18

[52] U.S. Cl. ........................................ 52/584; 292/111

[58] Field of Search ....................... 52/127.9, 583, 584, 52/585; 292/111, 113

[56] References Cited

U.S. PATENT DOCUMENTS

| | | | |
|---|---|---|---|
| 10,950 | 7/1888 | Smith | 292/111 |
| 475,572 | 5/1892 | Koenen | 292/111 |
| 1,677,825 | 7/1928 | Hilty | 292/111 |
| 2,714,751 | 8/1955 | Stuart | 52/584 |
| 3,191,244 | 6/1965 | Burke | 20/92.4 |
| 3,472,545 | 10/1969 | Berkowitz | 292/111 |
| 3,565,469 | 12/1968 | Zwart | 52/584 |
| 3,661,410 | 5/1972 | Larson | 52/127.9 |
| 3,784,240 | 1/1974 | Berkowitz | 292/111 |

OTHER PUBLICATIONS

Advertising Literature - Kason Company, pp. 77,78, Binghamton, N.Y.

*Primary Examiner*—John E. Murtagh
*Assistant Examiner*—Kathryn L. Ford
*Attorney, Agent, or Firm*—Blum, Kaplan, Friedman, Silberman & Beran

[57] ABSTRACT

The panel fastener includes an externally driven crank having a first pin slidably engaging a first cam surface formed on a hook member. A second pin fixed on said hook member slidably engages a second cam surface having a fixed position. Rotation of said crank on center axis induces cam action causing said hook member to first rotate and then retract. Thereby, the hook member when located on one panel can engage a pin fixed on an independent second panel and join and draw together said panels. Alignment of the pins and crank axis prevents loosening or disengagement of the joined panels without intentional reverse operation of the crank.

20 Claims, 7 Drawing Figures

FIG. 5
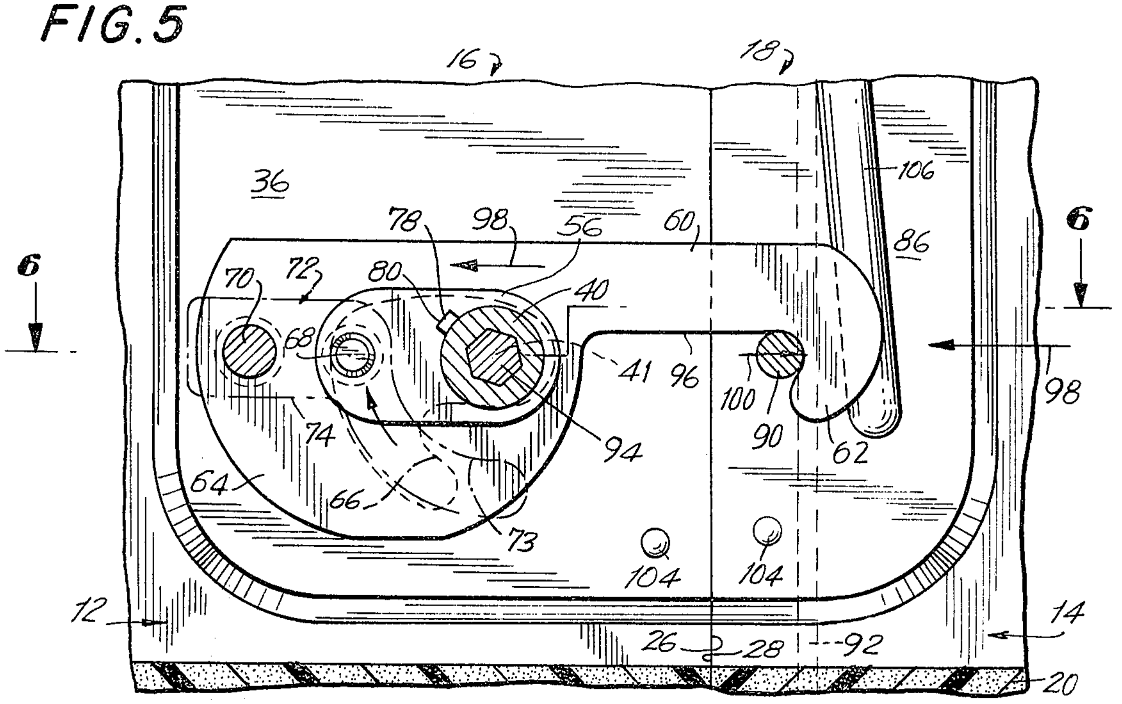
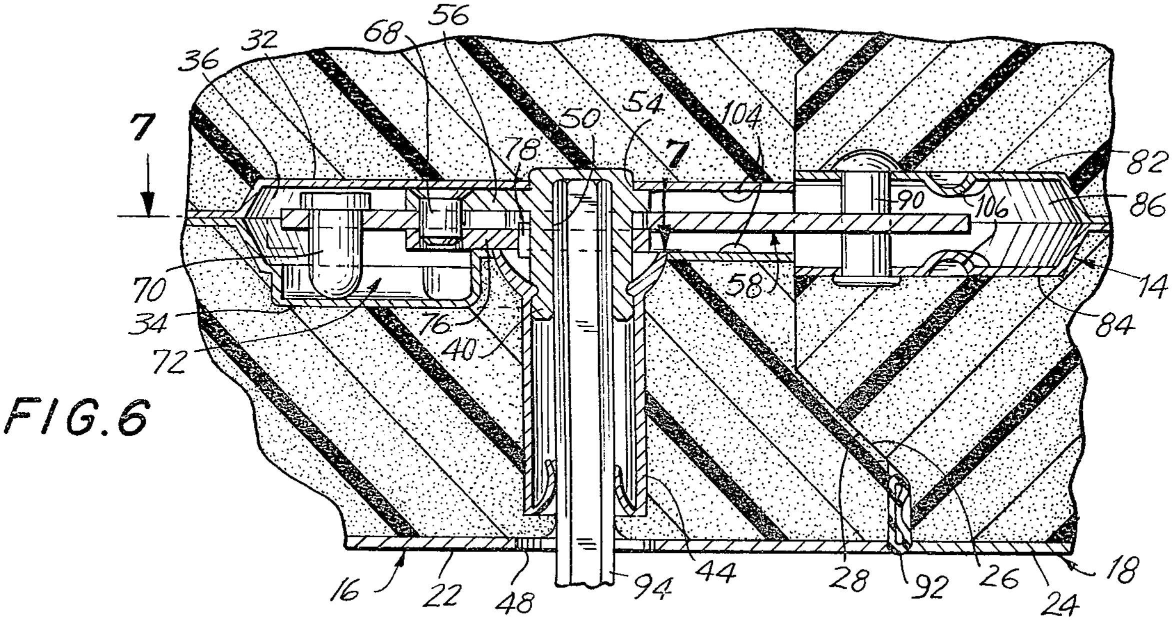
FIG. 6
FIG. 7
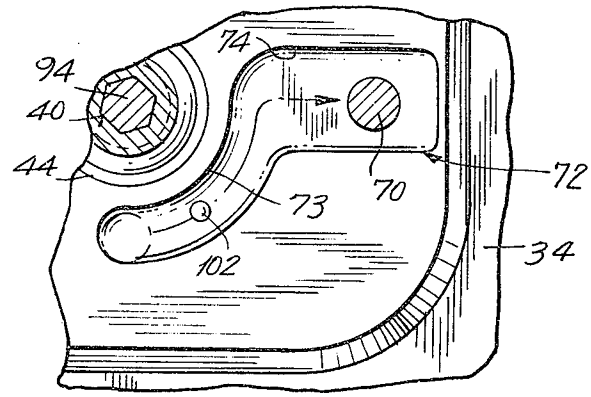

DIRECT DRIVE POSITIVE LOCKING PANEL FASTENER

BACKGROUND OF THE INVENTION

This invention relates generally to a panel fastener of the type used to hold adjacent wall panels together and more particularly to a panel fastener providing a compound motion whereby adjacent panels are joined and compressed together at the joint. For various reasons, in commercial, industrial and consumer oriented applications, there is a need to join together, simply and efficiently, prefabricated wall panels. The applications vary but frequently a leak-tight joint between wall panels is desired. Such an application would be a refrigerated cooler unit. The use of prefabricated interlocked wall panels provides a high degree of flexibility in producing the external configuration for the cooler unit. Gaskets in the joints and interlocking features where adjacent panels abutt facilitate the production of a leak-tight joint which is so essential in cooler units. In the prior art, it is known to have a hook extend from one panel and engage a pin or receptacle on the adjacent panel to be joined. For example, a well known hook and eye can be utilized. It is also known to retract the hook within the panel to which it is fastened after the pin in the adjacent panel is engaged, thereby drawing the panels together. However, in using many of these panel fasteners of the prior art, it is necessary to have adjacent panels in good alignment before an effective joining can be accomplished, or it may be necessary to tilt one of the panels to be joined such that engagement between the hook and pin is made before the panels can be drawn tightly together. In cooler units, the central core of the wall panels may be of insulating material, for example, foam, in which case the panel fastener elements are frequently foamed in place within the wall panels during manufacture.

What is needed is a panel fastener which joins and draws together adjacent wall panels in a tight connection and can tolerate a degree of misalignment prior to joining.

SUMMARY OF THE INVENTION

Generally speaking, in accordance with the invention, a panel fastener especially suitable for forming a compressive joint between wall panels is provided. The fastener includes an externally driven crank having a first pin slidably engaging a first cam surface formed on a hook member. A second pin fixed on said hook, member slidably engages a second cam surface having a fixed position. Rotation of said crank induces cam action causing said hook member to first rotate and retract. Thereby, the hook member attached to one panel to be joined can engage a pin on an independent second panel and join and draw together said panels. The fastener comprises two independent portions, each portion being suitable for attachment on or within a wall panel. A degree of misalignment between panels to be joined can be tolerated in the panel fastener without affecting the final joint, and a detent holds the panel fastener in a position ready for use during shipment. A dead center positioning of the pins and crank axis in the fastened position prevents compressive forces at the joint from loosening the connection.

Accordingly, it is an object of this invention to provide an improved panel fastener which pulls adjacent panels together to form a compressive joint.

Another object of this invention is to provide an improved panel fastener which is engaged without need for tilting of panels.

A further object of this invention is to provide an improved panel fastener which retains an open position or a closed position until actuated by external means.

Still another object of this invention is to provide an improved panel fastener which cannot be over torqued.

Yet another object of this invention is to provide an improved panel fastener which permits any number of openings and closings without failure.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 4 and 5 are similar to FIG. 3, showing sequential steps in the operation of the panel fastener in accordance with this invention;

FIG. 6 is a sectional view taken along the line 6—6 of FIG. 5; and

FIG. 7 is a fragmentary view taken along the line 7—7 of FIG. 6.

DESCRIPTION OF THE PREFERRED EMBODIMENTS

Figure 1:
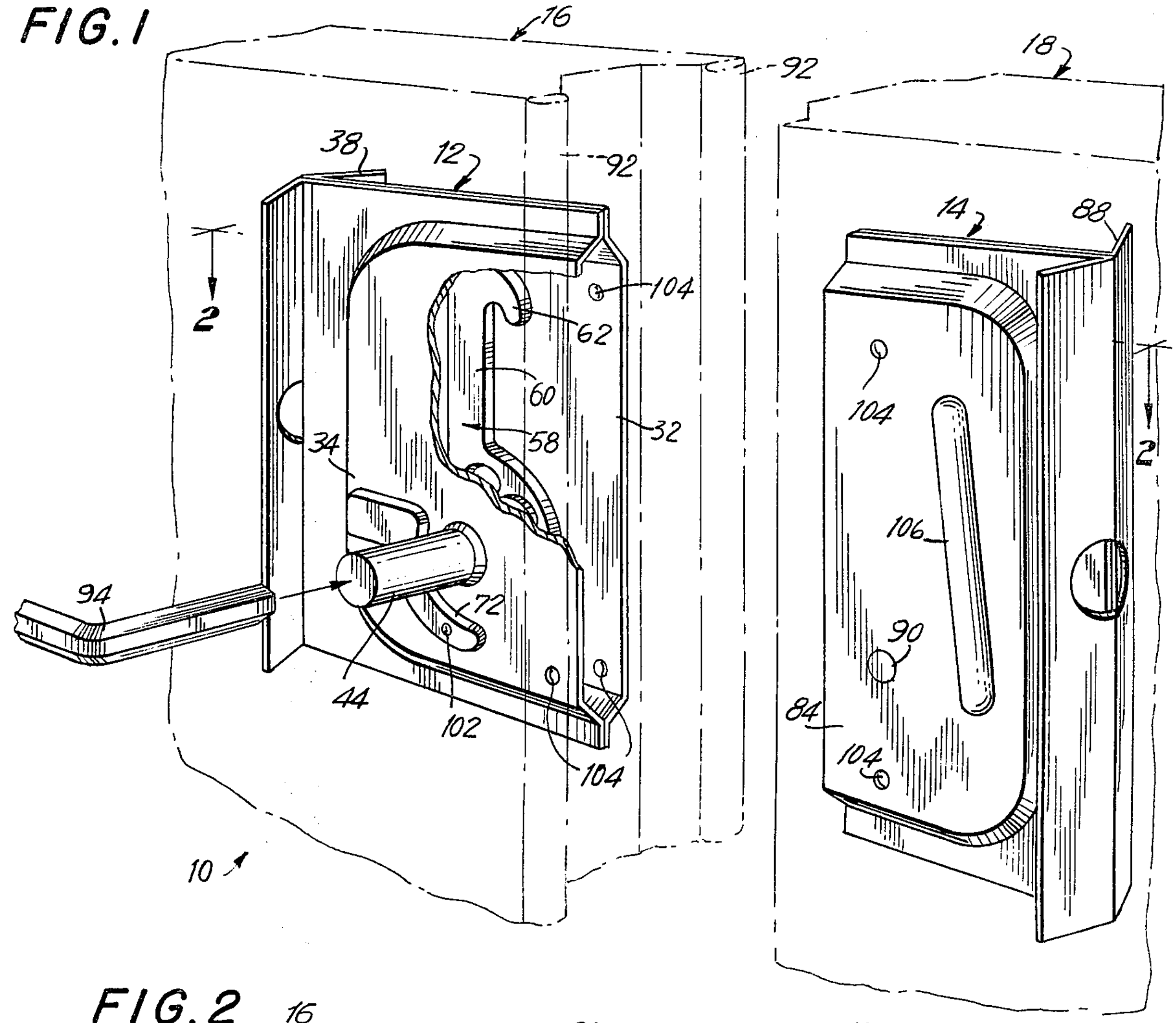
FIG. 1 is a front perspective view, partially broken away, of a panel fastener in accordance with this invention.

With reference to the Figures, a panel fastener 10 in accordance with this invention comprises an active member 12 and a passive member 14. The active member is attached to a wall panel 16 and the passive member 14 is attached to an independent wall panel 18.

In the exemplary embodiment of the Figures, the wall panels 16, 18 are of the insulated type suitable for a cooler unit and comprise an insulating material 20 enclosed between rigid outer skins, for example, of metal. The panel fastener members 12, 14 are enclosed within and anchored to the insulating material 20. The end surfaces 26,28 of the wall panels 16, 18 are contoured for mating when the adjacent panels are moved together in the direction as indicated by the arrows 30 in FIG. 2.

The active member 12 of the panel fastener 10 in accordance with this invention includes a pair of casings 32, 34 joined together to provide a hollow compartment 36 isolated from the insulating material 20. The casings 32, 34 extend beyond the compartment 36 and are turned outwardly and back to form an anchor 38 in the insulating material which resists forces, which as explained more fully hereinafter, tend to pull the active member out of the insulating material 20 through the end surface 26. It should be appreciated that all external surfaces of the members 12, 14 in the panel fastener 10 in accordance with this invention aid in resisting forces tending to separate the members 12, 14 from the insulating material 20.

A crank shaft 40 extends from the hollow compartment 36 through an opening 42 in the casing 34. A hollow shield 44 engages a circular groove 46 around the crank shaft 40 and extends outwardly to terminate beneath but substantially flush with the outer skin 22. An opening 48 in the skin 22 provides access to the interior of the hollow shield 44 and to the end of the crankshaft 40, which, as best seen in FIGS. 3–7 includes a hexagonal socket 50. Attachment of the shield 44 to the casing 34 prior to foaming in place, assures free access to the crank shaft 40 excepting perhaps a very thin layer of insulating material 20 which is easily penetrated between the end of the hollow shield 44 and the outer skin 22.

The end 52 of the crank shaft 40 is rotatably seated in an opening 54 in the casing 32. A crank 56 is fixedly attached to the crank shaft 40 for rotation therewith.

A hook member 58 includes an extended arm 60 having at one end a hook 62 and at the other end an enlarged portion 64 including an internal opening 65 having its periphery contoured to form a cam surface 66. The crank shaft 40 extends transversely through the internal opening 65 of the hook member 58.

As seen in FIGS. 3–6, a pin 68 fixedly attached to the crank 56 extends through the opening 65 and rides on the internal cam surface 66. As explained more fully hereinafter, when the crank shaft 40 is rotated, the pin 68 presses against the cam surface 66 causing the hook member 58 to pivot.

Figure 3:
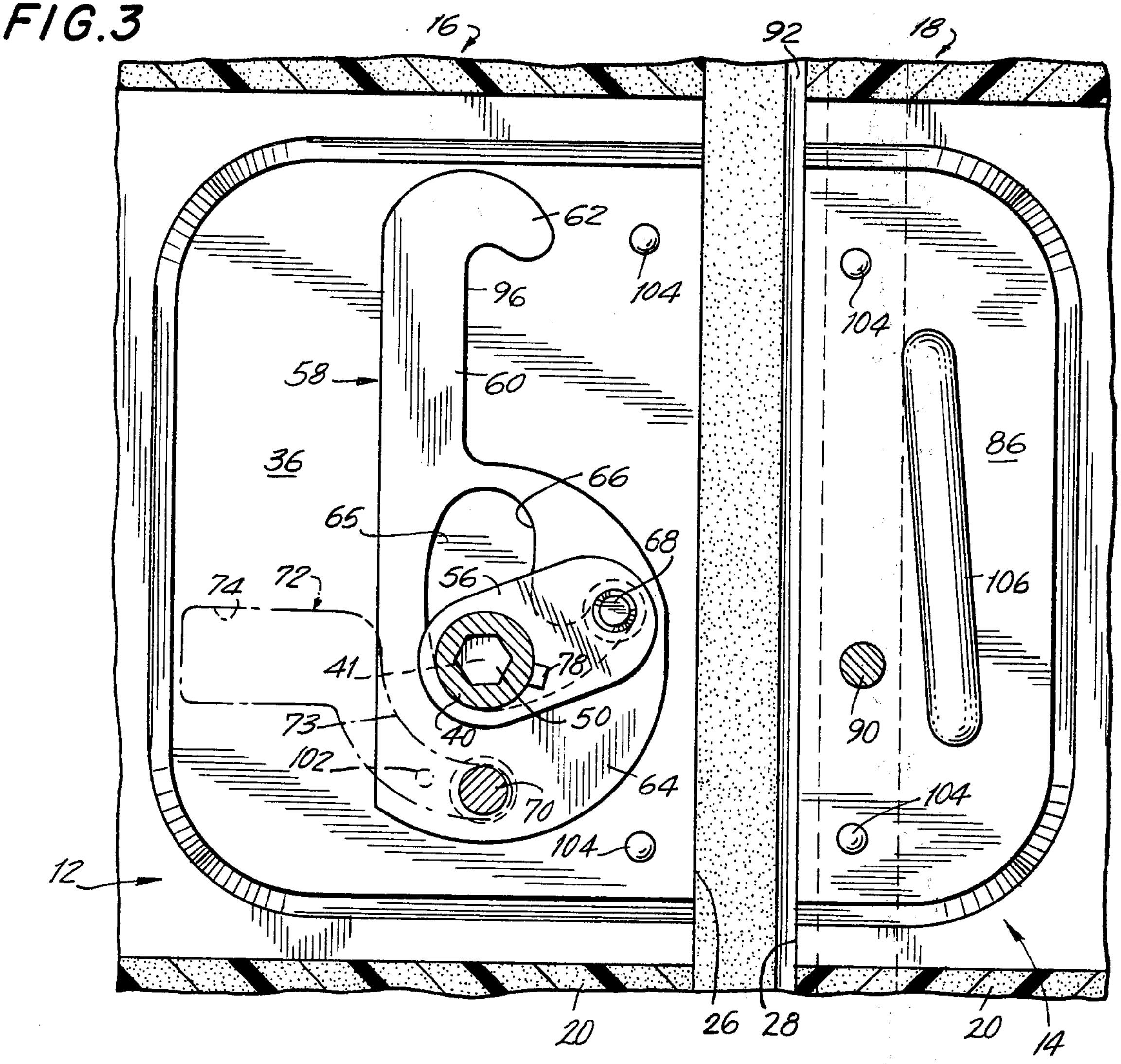
FIG. 3 is a view taken along the line 3—3 of FIG. 2.

A pin 70 fixedly attached to the hook member 58 at a position opposite from the hook 62 extends transversely to engage in a cam surface 72 formed in the casing 34. The cam surface 72 is in two portions, a circular portion 73 concentric with the rotating axis 41 of the crank shaft 40. The circular portion 73 of the cam surface 72 joins a linear portion 74 extending transversely away from the end surface 26 of the wall panel 16 (FIG. 3).

A crank backplate 76 is fixedly positioned on the crank shaft 40 for rotation therewith by means of a key 78 engaging a rectangular notch 80 in the backplate 76. Accordingly, the hook member 58 is sandwiched between the crank 56 and the crank backplate 76. The crank 56 and the backplate 76 bear on the casings 32, 34 respectively, thereby substantially centering the hook member 58 between the casings 32, 34.

Casings 82, 84 in the wall panel 18 are joined together leaving a hollow compartment or housing 86 open at the interface surface 28 and having an anchor 88 similar to the anchor 38 in the panel 16 for the same purpose of retention within the insulating material 20 against forces which tend to extract the passive member 14.

A lock pin 90 connects between the two opposed casings 82, 84. The pin 90 is located at an elevation (FIG. 3) within the passive member 14 such that when the members 12, 14 are opposed at the interface 26, 28 of wall panels to be connected, there is a horizontal alignment between the pin 90 and the rotating axis 41 of the crank shaft 40. It should also be noted in FIG. 3 that there is sufficient height in the housing 86 to permit the hook member 58 to pivot and extend across the interface 26,28 to engage the lock pin 90, as explained more fully hereinafter. It should also be noted that there is substantial horizontal alignment between the lock pin 90, the rotating axis 41 of the crank shaft 40 and the linear portion 74 of the cam surface 72.

Figure 2:
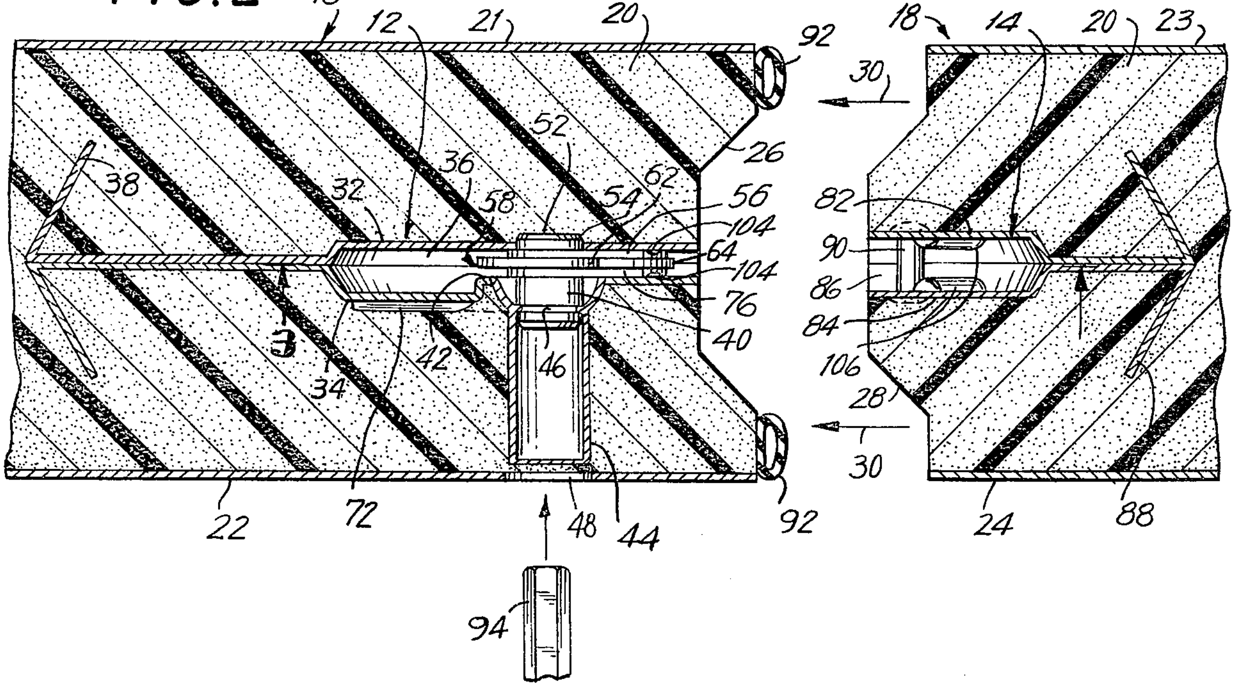
FIG. 2 is a sectional view taken along the line 2—2 of FIG. 1.

Joining and fastening of two panels using the panel fastener 10 in accordance with this invention, is now described. With the hook member 58 in the vertical position as shown in FIGS. 1–3, that is, withdrawn between the casings 32, 34 of the active member 12, the wall panels 16, 18 to be fastened together are moved into abutting contact. This motion is indicated by the arrows 30 in FIG. 2. The wall panel 16 in the Figures is shown with a compressible gasket 92. The members 12, 14 of the panel fastener 10 have been foamed in-place in the wall panels 16, 18 at equal heights so that when the wall panels 16, 18 are moved together the opened compartments or housings 36, 86 have their openings opposed one to the other. Then a key or wrench 94, having a hexagonal cross section, is inserted into the hexagonal socket 50 of the crank shaft 40 passing through the opening 48 in the outer skin 22 and through the hollow shield 44. It should be noted that the cam surface 66 in the hook member 58 is in the shape of an asymmetrical heart with the crank pin 68 constrained from above (FIG. 3) by the cam contour 66 whereby the hook member 58 cannot pivot in a clockwise direction unless the crank 56 and crank shaft 40 are also rotated. Further, the pin 70 on the hook member 58 is located at the extreme end of the cam surface 72 such that the hook member 58 cannot readily turn in a counter-clockwise direction (FIG. 3).

Figure 4:
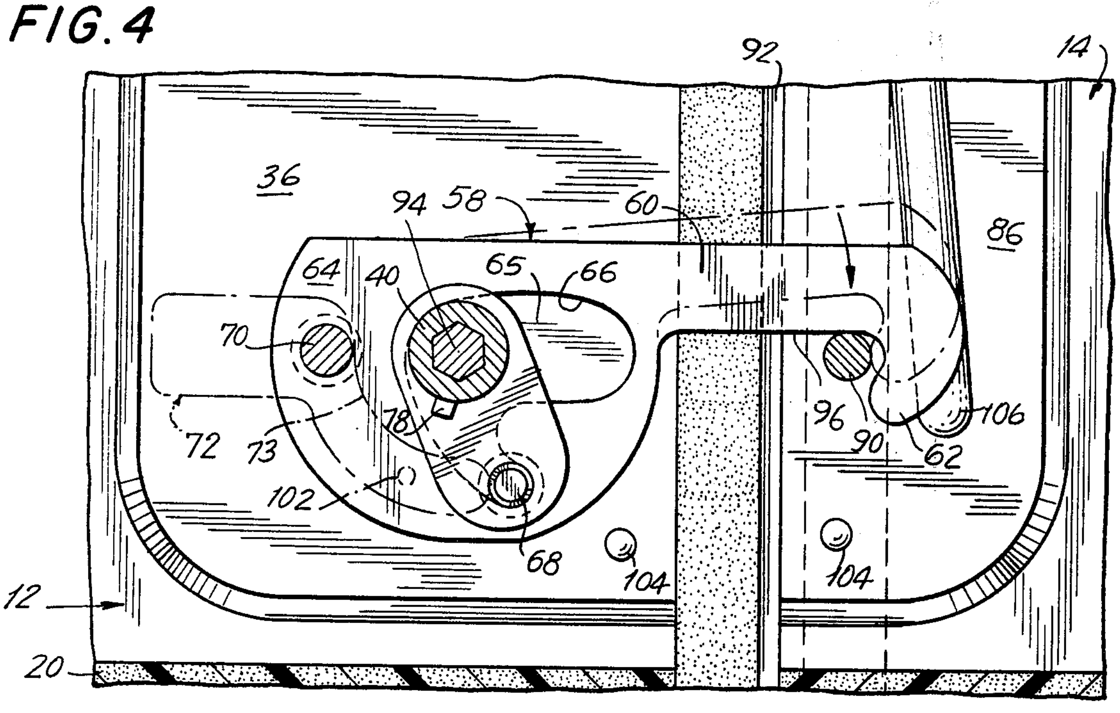

After the key or wrench 94 is inserted in the crank shaft 40, the wrench 94 is rotated in a clockwise direction. As shown in FIG. 4, the hook member 58 moves in a clockwise direction in substantially rotational motion. The hook member 58 is driven by the crank pin 68 which remains nested within the contours of the cam surface 66 as described above. The pin 70, attached to the hook member 58 moves along the circular portion 73 of the cam surface 72 formed in the casing 34. The pin 70 moves without interference because, as stated above, the circular portion 73 of the cam surface is concentric with the axis of rotation 41 of the crank shaft 40.

During this clockwise rotation of the hook member 58, the hooked end 62 extends across the interface 26, 28 between the panel 16, 18, into the open housing 86 with the hook extending above and beyond the pin 90 as shown in the broken lines of FIG. 4. The rotary motion continues until the inner surface 96 rests on top of the pin 90. As the key or wrench 94 is further turned in a clockwise direction, the arm 60 of the hook, unable to move downwardly because of its obstruction by the pin 90, moves horizontally in the direction indicated by the arrow 98 (FIG. 5) with the pin 70 on the hook member 58 moving within the confines of the horizontal linear portion 74 of the cam surface 72. In the process, the gasket material 92 is compressed (FIG. 6) and the wall panels 16, 18 abut at the interface 26, 28.

Protrusions 106 extend inwardly into the housing 86 from the casings 82, 84. As best seen in FIGS. 4 and 5, the extreme end of the moving hook member 58 slides between the protrusions 106 such that the hook member 58 is substantially centered between the casings 82, 84 (FIG. 6). When lateral misalignment exists between the panels 16, 18 prior to joining, the increasd width at the entrance to the housing 86 at the interface surface 28 allows for entrance of the hook member 58. The protrusions 106 then guide the hook member 58 to a centered position thereby laterally aligning the panel in the process.

As best seen in FIG. 7, the horizontal linear portion 74 of the cam surface 74 has a height which is substantially greater than the diameter of the pin 70. Thus, even when the panels 16, 18 are vertically misaligned at the interface 26, 28, the pin 70 nevertheless enters the horizontal portion 74 of the cam surface 72. The panels are drawn together and in the process are vertically aligned.

As the panels are drawn together by continued clockwise rotation of the key or wrench 94, the crank pin 68 moves upwardly along the cam surface 66 and achieves a position substantially in line with the pins 70, 90 and the crank shaft 40 (FIG. 5). It is also possible to have the final position of the crank pin 68 above (FIG. 5) the axis of rotation 41 of the crank 56 thereby providing an over-center condition rather than a dead-center condition as illustrated in FIG. 5.

With the gasket material 92 under compression at the interface, a force tending to drive the panels 16, 18 apart in a direction opposite from the arrows 98, may exist. This causes the pin 90 to push on the hook 62 in the direction of the arrow 100. However, the dead-center condition of the crank pin 68 and the pin 70 relative to the axis of rotation 41 of the shaft prevents motion which would allow the fastener to release unintentionally. In an overcenter condition (not shown) of the crank pin 68 the compressive forces on the gasket material 92 would act to prevent the unintentional release of the panel members.

The panels can be released by turning the key or wrench 94 in a counter-clockwise direction as would be seen in the FIGS. 1–6. Disengagement then proceeds in a reverse sequence with the hook member 58 moving in the horizontal direction opposite to the arrow 98, thereby allowing the panels 16, 18 to move apart. Then, the hook member 58 pivots and rotates in a compound motion counter-clockwise and returns to the condition shown in FIG. 3. The procedures of fastening and disengaging the panels can be repeated without damage to the panel fastener or to the panels themselves. It is not necessary to tilt either panel to assure that the hook 62 will pass around the pin 90 for engagement.

A dimple 102 in the circular portion 73 of the cam opening 72 provides a minor obstruction which further assures that the pin 70 is retained in the position shown in FIG. 3 during shipment of a panel 16. However, when the crank 56 rotates, the pin 70 easily rides over the dimple 102. Other indents and protrusions 104 serve various functions which are not a novel portion of this invention, and accordingly, require no description herein. For example, these indents and protrusions may be used to position the fastener members 12, 14 between the outer skins 21–24 prior to foaming in-place. They also serve in anchoring the members 12, 14 within the foam material 20. It should be noted that small amounts of foam within the compartments or housings 36, 86 are easily broken through by the motion of the crank and hook member and no clean-out is required. Also, should foam obstruct the entrance to the hollow shield 44, there is no need for cleaning as this thin foam barrier is readily penetrated by insertion of the key or wrench 94. The compound motions produced by means of the two cams and followers reduces friction and wear on the internal components and substantially extends the life of the panel fastener in accordance with the invention. As previously stated, the joint between the panel members can be repeatedly opened and closed without damage to the fastener or the wall members. It is not necessary to tilt either panel in these processes. The fastened position (FIG. 5) of the pin 68 against the cam surface 66 is the limit of compression on the interface surface. The panels cannot be damaged by excessive torque on the wrench 94.

It should be readily understood that the members 12, 14 in alternative embodiments may be located on the outside surfaces of the panels and not buried within the core materials. In such embodiments, the anchors 38, 88 are unnecessary and any suitable fastener, for example, screw fasteners, may be used to hold the members to the wall panels. Also, it should be readily understood that the interface between the wall panels need not be as illustrated in FIG. 2 but may be, for example, entirely planar, curved, etc.

It should also be understood that in an alternative embodiment in accordance with this invention, the hook 62 and lock pin 90 can be replaced with a T-shaped yoke at the end of the hook member 58 and a receptacle in the passive member 14. In effect, the pin may become a transverse portion of the hook member 58 which is received in a notch, socket or other receptacle in the passive member.

Further, it should be understood that in alternative embodiments in accordance with this invention, the positions of the pins 68, 70 and the cam surfaces 66, 72 can be reversed. That is, a pin corresponding to pin 68 can be fixedly attached to the hook member 58 and extend through an opening and engage a cam surface which is part of the crank 56. Similarly, a pin corresponding to the pin 70 can be attached to and extend from the housing 34 and engage a cam surface formed in the enlarged portion 64 of the hook member 58. The cam surfaces may be contoured to produce the same compound motions as previously described.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A panel fastener for drawing together and joining a first and second panel at an interface, comprising:

a moving member movably connected to said first panel, said moving member having a length adapted to extend a portion of said moving member across said interface;

a crank shaft and a crank connected for rotation with said crank shaft;

first cam means connected to said crank for rotary motion therewith and first cam follower means for engaging said moving member with said crank, rotation of said crank causing one of direct rotary drive of said moving member and relative motion between said first cam means and said first cam follower means, said moving member moving in a first prescribed motion determined directly by said crank;

a first fixed member connected to said first panel;

second cam means and second cam follower means for engaging said moving member with said first fixed member, motion of said moving member causing relative motion between said second cam and said second cam follower means, said moving member moving in a second prescribed motion determined in part by said second cam means and the contours of said second cam follower means and in part by said first cam means and the contours of said first cam follower means;

a second fixed member connected to said second panel;

means for releasably engaging said second fixed member with said portion of said moving member when said portion extends across said interface, said extending across said interface being a portion of said first prescribed motion of said moving member.

2. A panel fastener as claimed in claim 1, wherein said crank, cams and followers are adapted to move said moving member substantially linearly in a direction substantially transverse to said interface, said substantially linear motion being said second prescribed motion, occurring after said moving member is extended across said interface and engages with said second fixed member, said panels being drawn together into abutment.

3. A panel fastener as claimed in claim 2, wherein said crank cams and followers are adapted to move said moving member across said interface in a substantially circular motion, said substantially circular motion being said first prescribed motion.

4. A panel fastener as claimed in claim 1, 2 or 3, wherein said first cam means is connected to said moving member and said first cam follower means is connected to said crank.

5. A panel fastener as claimed in claim 4, wherein said second cam means is connected to said first fixed member and said second cam follower means is connected to said moving member, said second cam follower being loosely constrained by said second cam means to accommodate vertical misalignment between said first and second panels.

6. A panel fastener as claimed in claim 5, wherein said means for releasably engaging is a hook on said extending portion of said moving member, and a pin connected to said second panel.

7. A panel fastener as claimed in claim 1 or 3, wherein said first fixed member is a first housing, said first housing supporting at least said crank shaft, crank, cam and follower means, and moving member, said first housing including a first opening at said interface, said moving member when extending across said interface passing through said first opening.

8. A panel fastener as claimed in claim 6, wherein said first fixed member is a first housing, said first housing supporting at least said crank shaft, crank, cam and follower means, and moving member, said first housing including a first opening at said interface, said moving member when extending across said interface passing through said first opening.

9. A panel fastener as claimed in claim 7, and further comprising a second housing, said second housing supporting said second fixed member, said second housing including a second opening at said interface, said moving member when extending across said interface passing through said second opening to engage said second fixed member, said second opening being wider than said first opening to accommodate lateral misalignment between said first and second panels.

10. A panel fastener as claimed in claim 8, and further comprising a second housing, said second housing supporting said second fixed member, said second housing including a second opening at said interface, said moving member when extending across said interface passing through said second opening to engage said second fixed member, said second opening being wider than said first opening to accommodate lateral misalignment between said first and second panels.

11. A panel fastener as claimed in claim 7, wherein said second cam means is formed in a surface of said first housing.

12. A panel fastener as claimed in claim 8, wherein said second cam means is formed in a surface of said first housing.

13. A panel fastener as claimed in claim 11, and further comprising a dimple, said dimple being located in said second cam means, said dimple locally impeding said relative motion between said second cam means and said second cam follower means, said second cam follower means moves past said dimple only upon application of a turning force on said crank shaft.

14. A panel fastener as claimed in claim 12, and further comprising a dimple, said dimple being located in said second cam means, said dimple locally impeding said relative motion between said second cam means and said second cam follower means, said second cam follower means moves past said dimple only upon application of a turning force on said crank shaft.

15. A panel fastener as claimed in claim 2, wherein said first cam follower means is a pin connected to said crank, said second cam follower means is a pin connected to said moving member, said cam means being adapted to align said pins and said crank shaft when said panels are drawn together by said substantially linear motion of said moving member, said moving member being engaged with said second fixed member.

16. A panel fastener as claimed in claim 15, wherein said second fixed member is a pin, and said pins in alignment with said crank shaft are also in alignment with said pin in said second panel when said panels lock together, whereby forces exerted on said moving member by said engaged pin in said second panel do not dislodge the position of said moving member.

17. A panel fastener as claimed in claim 1, wherein said crank shaft includes means for releasably connecting with external means for turning said crank shaft.

18. A panel fastener as claimed in claim 17, wherein said means for connecting includes a recess in said crank shaft.

19. A panel fastener as claimed in claim 18, and further comprising a shield for said recess, said shield including a hollow tube, said hollow tube extending coaxially from said crank shaft.

20. A panel fastener as claimed in claim 9, and further comprising lateral constraints for said extended portion of said moving member, said constraints being located within said second housing, said constraints acting on said moving member forcing laterally misaligned panels into alignment.

* * * * *